(12) United States Patent
Meyer et al.

(10) Patent No.: US 8,838,731 B2
(45) Date of Patent: Sep. 16, 2014

(54) METHOD AND APPARATUS FOR DYNAMICALLY LOCATING RESOURCES

(75) Inventors: Gordon Ross Meyer, Santa Clara, CA (US); Jessica Kahn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 359 days.

(21) Appl. No.: 12/790,641

(22) Filed: May 28, 2010

(65) Prior Publication Data

US 2010/0241728 A1    Sep. 23, 2010

Related U.S. Application Data

(63) Continuation of application No. 10/263,008, filed on Oct. 1, 2002, now Pat. No. 7,730,155.

(51) Int. Cl.
*G06F 15/16* (2006.01)
(52) U.S. Cl.
USPC ............ 709/217; 709/218; 709/219; 709/220
(58) Field of Classification Search
USPC .................................. 709/217, 218, 219, 229
See application file for complete search history.

(56) References Cited

U.S. PATENT DOCUMENTS

| | | | |
|---|---|---|---|
| 4,747,040 A | 5/1988 | Blanset et al. |
| 4,787,026 A | 11/1988 | Barnes et al. |
| 4,984,149 A | 1/1991 | Iwashita et al. |
| 5,040,110 A | 8/1991 | Miki et al. |
| 5,131,089 A | 7/1992 | Cole |
| 5,146,568 A | 9/1992 | Flaherty et al. |
| 5,257,378 A | 10/1993 | Sideserf et al. |
| 5,280,627 A | 1/1994 | Flaherty et al. |
| 5,291,584 A | 3/1994 | Challa et al. |
| 5,325,529 A | 6/1994 | Brown et al. |
| 5,339,430 A | 8/1994 | Lundin et al. |
| 5,452,454 A | 9/1995 | Basu |
| 5,454,098 A | 9/1995 | Pisello et al. |
| 5,459,850 A | 10/1995 | Clay et al. |
| 5,465,364 A | 11/1995 | Lathrop et al. |
| 5,483,647 A | 1/1996 | Yu et al. |
| 5,491,813 A | 2/1996 | Bondy et al. |
| 5,499,378 A | 3/1996 | McNeill et al. |
| 5,546,585 A | 8/1996 | Soga |

(Continued)

OTHER PUBLICATIONS

"Device Configuration Assistant Design Overview" Sun Microsystems, 1999 (8 pages).

(Continued)

*Primary Examiner* — Djenane Bayard
(74) *Attorney, Agent, or Firm* — Blakely, Sokoloff, Taylor & Zafman LLP

(57) ABSTRACT

Methods and apparatuses for dynamically locating resources. In one aspect of the invention, a method to retrieve a resource for a digital processing system includes: receiving a request for a resource; downloading a first version of the resource from a server through a network connection to satisfy the request if the first version of the resource is retrievable through the network connection; and loading a second version of the resource from a storage device of the digital processing system if the first version of the resource is not retrievable through a network connection. In one example, downloading the first version is performed in response to a determination that the first version of the resource is different from a second version of the resource on a storage device of the digital processing system.

22 Claims, 7 Drawing Sheets

(56) References Cited

U.S. PATENT DOCUMENTS

| | | |
|---|---|---|
| 5,548,783 A | 8/1996 | Jones et al. |
| 5,603,011 A | 2/1997 | Piazza |
| 5,666,293 A | 9/1997 | Metz et al. |
| 5,694,583 A | 12/1997 | Williams et al. |
| 5,717,903 A | 2/1998 | Bonola |
| 5,724,530 A | 3/1998 | Stein et al. |
| 5,742,829 A | 4/1998 | Davis et al. |
| 5,754,774 A | 5/1998 | Bittinger et al. |
| 5,758,165 A | 5/1998 | Shuff |
| 5,764,992 A | 6/1998 | Kullick et al. |
| 5,784,581 A | 7/1998 | Hannah |
| 5,802,297 A | 9/1998 | Engquist |
| 5,842,011 A | 11/1998 | Basu |
| 5,859,978 A | 1/1999 | Sonderegger et al. |
| 5,890,014 A | 3/1999 | Long |
| 5,915,106 A | 6/1999 | Ard |
| 5,918,048 A | 6/1999 | Mealey et al. |
| 5,926,631 A | 7/1999 | McGarvey |
| 5,946,469 A | 8/1999 | Chidester |
| 5,948,101 A | 9/1999 | David et al. |
| 5,953,516 A | 9/1999 | Bonola |
| 5,958,020 A | 9/1999 | Evoy et al. |
| 5,968,170 A | 10/1999 | Gross et al. |
| 5,974,547 A | 10/1999 | Klimenko |
| 6,006,029 A | 12/1999 | Bianchi et al. |
| 6,006,034 A | 12/1999 | Heath et al. |
| 6,009,274 A | 12/1999 | Fletcher et al. |
| 6,009,480 A | 12/1999 | Pleso |
| 6,012,103 A | 1/2000 | Sartore et al. |
| 6,016,400 A | 1/2000 | Day et al. |
| 6,016,402 A | 1/2000 | Thomas et al. |
| 6,020,914 A | 2/2000 | Douhet |
| 6,023,585 A | 2/2000 | Perlman et al. |
| 6,038,601 A | 3/2000 | Lambert et al. |
| 6,064,566 A | 5/2000 | Agata et al. |
| 6,066,182 A | 5/2000 | Wilde et al. |
| 6,067,618 A | 5/2000 | Weber |
| 6,073,205 A | 6/2000 | Thomson |
| 6,128,734 A | 10/2000 | Gross et al. |
| 6,130,668 A | 10/2000 | Stein |
| 6,134,614 A | 10/2000 | Chari et al. |
| 6,161,176 A | 12/2000 | Hunter et al. |
| 6,163,853 A | 12/2000 | Findlay et al. |
| 6,170,008 B1 | 1/2001 | Bahlmann et al. |
| 6,175,917 B1 | 1/2001 | Arrow et al. |
| 6,175,918 B1 | 1/2001 | Shimizu |
| 6,178,503 B1 | 1/2001 | Madden et al. |
| 6,185,678 B1 | 2/2001 | Arbaugh et al. |
| 6,198,558 B1 | 3/2001 | Graves et al. |
| 6,199,204 B1 | 3/2001 | Donohue |
| 6,202,091 B1 | 3/2001 | Godse |
| 6,204,847 B1 | 3/2001 | Wright |
| 6,205,473 B1 | 3/2001 | Thomasson et al. |
| 6,209,031 B1 | 3/2001 | Casey et al. |
| 6,209,089 B1 | 3/2001 | Selitrennikoff et al. |
| 6,252,889 B1 | 6/2001 | Patki et al. |
| 6,253,209 B1 | 6/2001 | Chase-Salerno et al. |
| 6,260,068 B1 | 7/2001 | Zalewski et al. |
| 6,266,809 B1 | 7/2001 | Craig et al. |
| 6,269,396 B1 | 7/2001 | Shah et al. |
| 6,269,481 B1 | 7/2001 | Perlman et al. |
| 6,275,851 B1 | 8/2001 | Cromer et al. |
| 6,279,030 B1 | 8/2001 | Britton et al. |
| 6,279,109 B1 | 8/2001 | Brundridge |
| 6,292,941 B1 | 9/2001 | Jollands |
| 6,314,438 B1 | 11/2001 | Stein et al. |
| 6,317,826 B1 | 11/2001 | McCall et al. |
| 6,324,691 B1 * | 11/2001 | Gazdik ........................ 717/178 |
| 6,330,653 B1 | 12/2001 | Murray et al. |
| 6,330,715 B1 | 12/2001 | Razzaghe-Ashrafi |
| 6,334,149 B1 | 12/2001 | Davis, Jr. et al. |
| 6,345,294 B1 | 2/2002 | O'Toole et al. |
| 6,345,309 B2 | 2/2002 | Ohsawa et al. |
| 6,357,040 B1 | 3/2002 | Porter |
| 6,374,363 B1 | 4/2002 | Wu et al. |
| 6,393,560 B1 | 5/2002 | Merrill et al. |
| 6,401,093 B1 | 6/2002 | Anand et al. |
| 6,421,777 B1 | 7/2002 | Pierre-Louis et al. |
| 6,434,695 B1 | 8/2002 | Esfahani et al. |
| 6,438,683 B1 | 8/2002 | Endsley |
| 6,466,203 B2 | 10/2002 | Van Ee |
| 6,466,972 B1 | 10/2002 | Paul et al. |
| 6,477,642 B1 | 11/2002 | Lupo |
| 6,487,601 B1 | 11/2002 | Hubacher et al. |
| 6,490,677 B1 | 12/2002 | Aguilar et al. |
| 6,505,243 B1 * | 1/2003 | Lortz ........................... 709/220 |
| 6,513,061 B1 | 1/2003 | Ebata et al. |
| 6,519,633 B1 | 2/2003 | Kubik et al. |
| 6,529,948 B1 | 3/2003 | Bowman-Amuah |
| 6,535,976 B1 | 3/2003 | Hoggarth et al. |
| 6,543,004 B1 | 4/2003 | Cagle et al. |
| 6,564,232 B1 | 5/2003 | Cole et al. |
| 6,578,069 B1 | 6/2003 | Hopmann et al. |
| 6,606,744 B1 | 8/2003 | Mikurak |
| 6,611,915 B1 | 8/2003 | Kubik et al. |
| 6,625,754 B1 | 9/2003 | Aguilar et al. |
| 6,631,442 B1 | 10/2003 | Blumenau |
| 6,633,916 B2 | 10/2003 | Kauffman |
| 6,671,748 B1 | 12/2003 | Cole et al. |
| 6,718,549 B1 | 4/2004 | Narin et al. |
| 6,728,787 B1 | 4/2004 | Leigh |
| 6,735,741 B1 * | 5/2004 | Pannu ........................... 715/234 |
| 6,751,658 B1 | 6/2004 | Haun et al. |
| 6,751,794 B1 * | 6/2004 | McCaleb et al. .............. 717/168 |
| 6,757,706 B1 | 6/2004 | Dong et al. |
| 6,785,885 B2 | 8/2004 | Norris et al. |
| 6,807,558 B1 | 10/2004 | Hassett et al. |
| 6,807,641 B1 | 10/2004 | Ishiguro et al. |
| 6,854,112 B2 | 2/2005 | Crespo et al. |
| 6,944,185 B2 | 9/2005 | Patki et al. |
| 6,944,857 B1 | 9/2005 | Glaser et al. |
| 6,976,057 B2 * | 12/2005 | Yoshiasa ........................ 709/216 |
| 6,976,252 B2 | 12/2005 | White et al. |
| 6,996,076 B1 | 2/2006 | Forbes et al. |
| 7,076,774 B2 | 7/2006 | Chrysanthakopoulos et al. |
| 7,089,551 B2 | 8/2006 | Fordemwalt et al. |
| 7,089,553 B1 | 8/2006 | Glaser et al. |
| 7,162,539 B2 | 1/2007 | Garcie-Luna-Aceves |
| 7,180,858 B1 | 2/2007 | Roy et al. |
| 7,249,354 B2 | 7/2007 | Tigani et al. |
| 7,281,047 B2 * | 10/2007 | Hayko et al. .................. 709/229 |
| 7,343,422 B2 | 3/2008 | Garcia-Luna-Aceves et al. |
| 7,552,233 B2 | 6/2009 | Raju et al. |
| 7,565,450 B2 | 7/2009 | Garcia-Luna-Aceves et al. |
| 7,577,754 B2 | 8/2009 | Garcia-Luna-Aceves et al. |
| 7,664,876 B2 | 2/2010 | Garcia-Luna-Aceves |
| 7,725,596 B2 | 5/2010 | Garcia-Luna-Aceves et al. |
| 7,797,353 B1 * | 9/2010 | Singh ........................... 707/805 |
| 7,908,337 B2 | 3/2011 | Garcia-Luna-Aceves et al. |
| 2003/0088716 A1 | 5/2003 | Sanders |
| 2004/0015953 A1 * | 1/2004 | Vincent ........................ 717/173 |
| 2004/0024848 A1 * | 2/2004 | Smith et al. .................. 709/219 |
| 2006/0206450 A1 | 9/2006 | Fletcher et al. |
| 2008/0209410 A1 * | 8/2008 | Demsky et al. ............... 717/168 |

OTHER PUBLICATIONS

"Etherboot," downloaded from www.slug.org.au/etherboot/ on Oct. 11, 1999, 4 pages.

"Netboot Introduction", Downloaded from www.han.de/.about.gero/netboot/english/introduction.html on Oct. 11, 1999, 13 pages.

Alexander, S. "HDCP Options and BOOTP Vendor Extensions" Network Working Group, RFC 2132, Mar. 1997 (34 pages).

Apple Computer, Inc., "Getting Started with Mac OS X Server: Includes Installation and Setup Inforamtion for Mac OS X Server version 10.2," pp. 1-24, 2002.

Arbaugh, William A., et al. "A Secure and Reliable Bootstrap Architecture" IEEE Symposium on Security and Privacy, May 4-5, 1997, pp. 65-71.

Burke, Michael G. et al., "The Jalapeno Dynamic Optimizing Compiler for Java™," IBM Thomas J. Watson Research Center, 1999 (14 pages).

Campbell, Andrew T. et al., "A Survey of Programmable Networks," 1999.

(56) References Cited

OTHER PUBLICATIONS

Chuang, Shaw-Cheng et al., "A Case Study of Secure ATM Switch Booting," IEEE 1996 (10 pages).
Croft, Bill and Gilmore, John. "Bootstrap Protocol (BOOTP)" Network Working Group RFC 951, Sep. 1985 (12 pages).
Davidson, Rusel and MacKinnon James G., "Bootstrap Tests: How Many Bootstraps?" Jun. 1998 (15 pages).
Estrin, Deborah et al. "A Dynamic Bootstrap Mechanism for Rendezvous-Based Multicast Routing" IEEE INFOCOM '99. Eighteenth Annual Joint Conference of the IEEE Computer and Communications Societies. vol. 3, Mar. 21-25, 1999, pp. 1090-1098.
Ford, Bryan et al. "The Flux OS Toolkit: Reusable Components for OS Implementation" IEEE May 5-6, 1997, pp. 14-19.
Ford, Bryan et al., "The Flux OSkit: A Substrate for Kernel and Language Research," 1997 (15 pages).
Hesterberg, Tim C., "Bootstrap Tilting Inteference and Large Data Sets—Proposal to NSF SBIR Program," Jun. 11, 1998, pp. 2-22.
Hobbs, M.J. et al., "Booting of the RHODOS Distributed Operating System," Sep. 8, 1984 (18 pages).
Kaszeta, Rich"A New Use for Old and Outdated PC's," Downloaded from www.menet.umn.edu/'kaszeta/unix/xterminal/index.html on Oct. 11, 1999, 8 pages.
Red Hat, Inc., "Red Hat Linux 9: Red Hat Linux Customization Guide," chapter 7-8, pp. 29-68, 2003.
Reynolds, J. "BOOTP Vendor Information Extensions" Network Working Group RFC 1395, Jan. 1993 (8 pages).
Uhlig, Richard et al., "Trap-Driven Simulation with Tapeworm II," *6th Int. Conf. Architectural Support for Programmin Languages and Operating Systems (ASPLOS-VI)*, Oct. 1994, pp. 1-13.
Wimer, W. "Clarifications and Extensions for the Bootstrap Protocol" Network Working Group, RFC 1532, Oct. 1993 (22 pages).
Wong, P.K. "Remote Boot Windows 95a Step by Step Instructions," Downloaded from wpkgate.kc.com.my/remoteboot/win95.text on Oct. 11, 1999, 5 pages.

\* cited by examiner

METHOD AND APPARATUS FOR DYNAMICALLY LOCATING RESOURCES

This application is a continuation of co-pending U.S. patent application Ser. No. 10/263,008, filed Oct. 1, 2002.

FIELD OF THE INVENTION

The invention relates to digital processing systems, and more particularly to dynamically locating resources using network connections when available.

BACKGROUND OF THE INVENTION

On a computer system, a resource is typically specified using a file name with a path (or directory) or a Universal Resource Locator (URL). HyperText Markup Language (HTML) documents use URL addresses to specify the locations of the resources that are required by these documents or linked to these documents through hyperlinks.

A complete URL address includes the network protocol for accessing the resource, the host address of the computer on which the resource resides, the directory in which the resource resides, and the file name of the resource. For example, URL address http://www.uspto.gov/main/patents.htm specifies that HTML document patents.htm is retrievable using Hypertext Transfer Protocol (HTTP) from directory /main of host www.uspto.gov. To retrieve patents.htm, a client computer contacts host www.uspto.gov using HTTP protocol to transfer file /main/patents.html from the HTTP server at www.uspto.gov. After receiving a request from the client for an HTML document, the HTTP server at the remote host (e.g., www.uspto.gov) typically maps the directory (e.g., /main) in the URL to a directory in the file system of the server computer to locate the corresponding HTML document specified in the URL address.

Relative URL addresses are typically used in an HTML document for specifying the locations of the resources relative to the location of the HTML document. For example, HTML document at http://www.uspto.gov/main/patents.htm may contain a hyperlink to relative URL address ./search.htm. From the base address of HTML document patents.htm, it can be determined that the complete address of document search.htm is http://www.uspto.gov/main/search.htm.

URL addresses can also be used to specify resources which reside locally on a computer system. For example, URL address file:///C:/main/patents.htm specifies an HTML document on a local hard drive C. A file on a computer is typically specified as a file name with a path. For example, file name C:/main/patents.htm contains path C:/main/. A file name with a path can also be considered as a relative URL address with a default base address (e.g., file:///)

URL addresses specify the exact locations of the corresponding resources so that a web browser can retrieve the resources from the locations as specified in the URL addresses. When the storage locations of the resources are moved (e.g., from a remote server to a local file system), the corresponding URL addresses for accessing these resources are changed accordingly in order to access the resources from the new locations. When relative URL addresses are used, only the base addresses are changed accordingly. The complete addresses for the relative URL addresses are changed automatically to reflect the changes in the base addresses, since the complete addresses for the relative URL addresses are computed from the base addresses and the relative URL addresses.

A web browser typically maintains a cache that stores some of the files retrieved from remote servers through a network connection. Such a web browser may use the resource stored in the cache to display a document when it assumes or determines that the resource on the remote server has not changed since the resource was downloaded and cached. For example, when the forward (or back) button on a web browser is pressed, the previous downloaded and cached version of the resource is used, assuming that there has been no change in the resource. When no network connection to the server is available, a web browser typically displays an error message, even when a version of the resource is previously downloaded and cached. A user may manually switch the web browser (e.g., Internet Explorer) from an online mode to an offline mode (e.g., work offline). When the web browser is in an offline mode, it can display, without a network connection, the web pages that have already been down loaded in the cache. If the user clicks on a link for a document that is not in the cache when the web browser is in the offline mode, the web browser informs the user that the document is not available in the offline mode; and the user has the option to keep the web browser in the offline mode or switch the web browser back to the online mode.

SUMMARY OF THE DESCRIPTION

Methods and apparatuses for dynamically locating resources are described here.

In one aspect of the invention, a method to retrieve a resource for a digital processing system includes: receiving a request for a resource; downloading a first version of the resource from a server through a network connection to satisfy the request if the first version of the resource is retrievable through the network connection; and loading a second version of the resource from a storage device of the digital processing system if the first version of the resource is not retrievable through a network connection. In one example according to this aspect, the network connection is automatically established before downloading the first version of the resource from the server, if the network connection is not already established. For example, a modem is instructed to initiate a connection to establish the network connection.

In one example, downloading the first version is performed in response to a determination that the first version of the resource is different from the second version of the resource on the storage device of the digital processing system. Thus, when the server has an updated version of the resource, the updated version of the resource is downloaded to satisfy the request. If no network connection to the server is available or downloading from the server is not successful, the second version of the resource from the storage device on the digital processing system is loaded to satisfy the request.

In one example, downloading from the server is performed if it is determined that a version of the resource on the server is preferred. The first version of the resource downloaded from the server is stored on the storage device of the digital processing system if downloading is successful. If it is determined that a version of the resource on the server is not preferred, the second version of the resource is loaded from the storage device on the digital processing system to satisfy the request. If a previously downloaded version of the resource exists on the storage device, the previously downloaded version of the resource is used to satisfy the request. Thus, the second version of the resource is different from the resource, if the second version of the resource is a previously downloaded version of the resource.

In one example, whether or not a version of the resource on a server is preferred is determined from a configuration file associated with the resource. An address of the server is also determined from the configuration file. In other examples, whether or not a version of the resource on a server is preferred is determined according to system conditions, and/or a file on a remote server. The address of the server may be hardwired, or determined from a search at a remote server, or determined from a file at a remote server.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
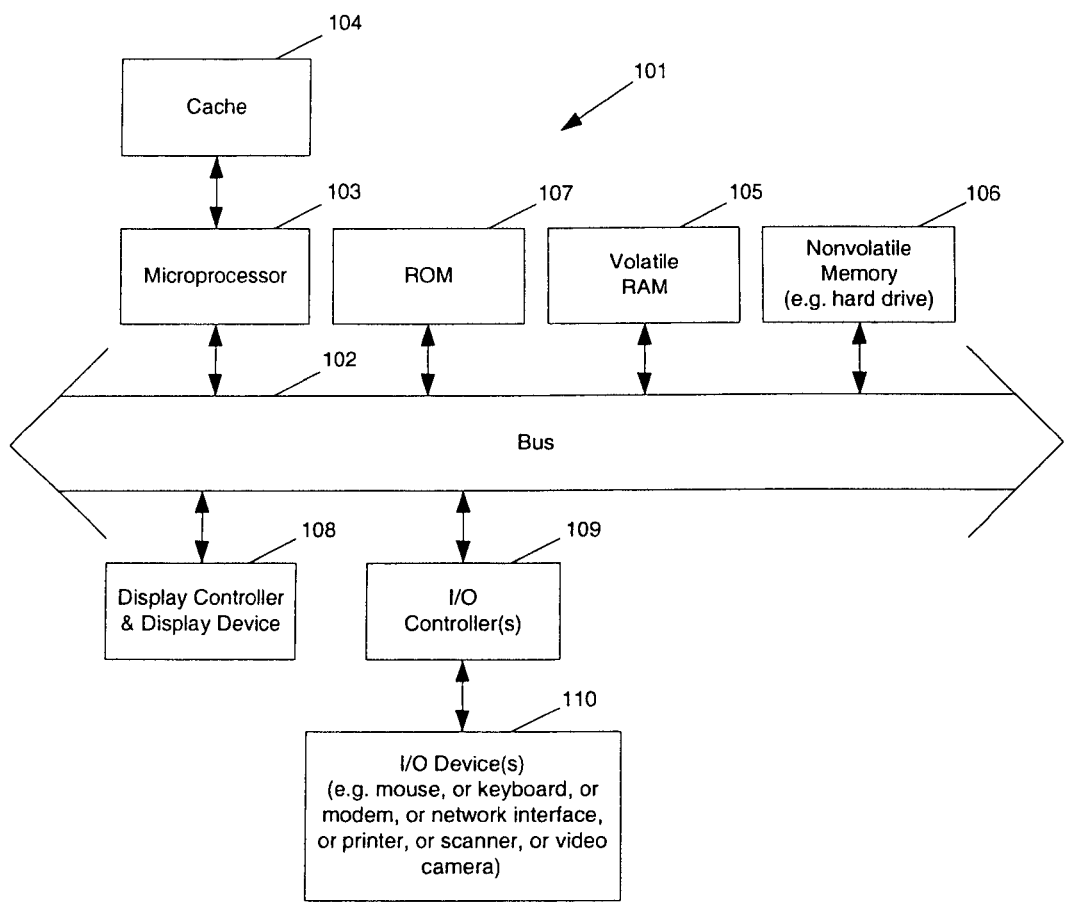
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media;

optical storage media; flash memory devices; etc.), as well as electrical, optical, acoustical or other forms of propagated signals (e.g., carrier waves, infrared signals, digital signals, etc.); etc.

At least one embodiment of the present invention seeks to dynamically locate resources so that an updated version of a resource on a remote server is used when the updated version of the resource is accessible. When the updated version of the resource is not accessible (or does not exist), a local version of the resource (e.g., a locally installed default version, a local version in a storage medium, such as a CD-ROM, a previously downloaded updated version, which may or may not have already been installed, or others) is used.

For example, in an HTML-based Help system, elements that appear on a page (e.g., images, audio clips, video clips, etc.) and hyperlinks to other pages are typically specified using URL addresses. Since the URL addresses specify the exact predetermined locations of the resources, a resource is normally either on the local file system or on a remote server. If the location is at the remote server, the resource can be easily updated; and the updated version of the resource is used after the resource is updated at the remote server. However, when the client computer cannot access the server (e.g., through the network), the client computer cannot retrieve the required resource from the remote server to provide the corresponding help document. If the location of the item is locally at the client computer, the resource can always be accessed regardless of the status of the network connectivity. However, a special procedure is required to update the resource (e.g., downloading and installing a software patch).

Figure 2:
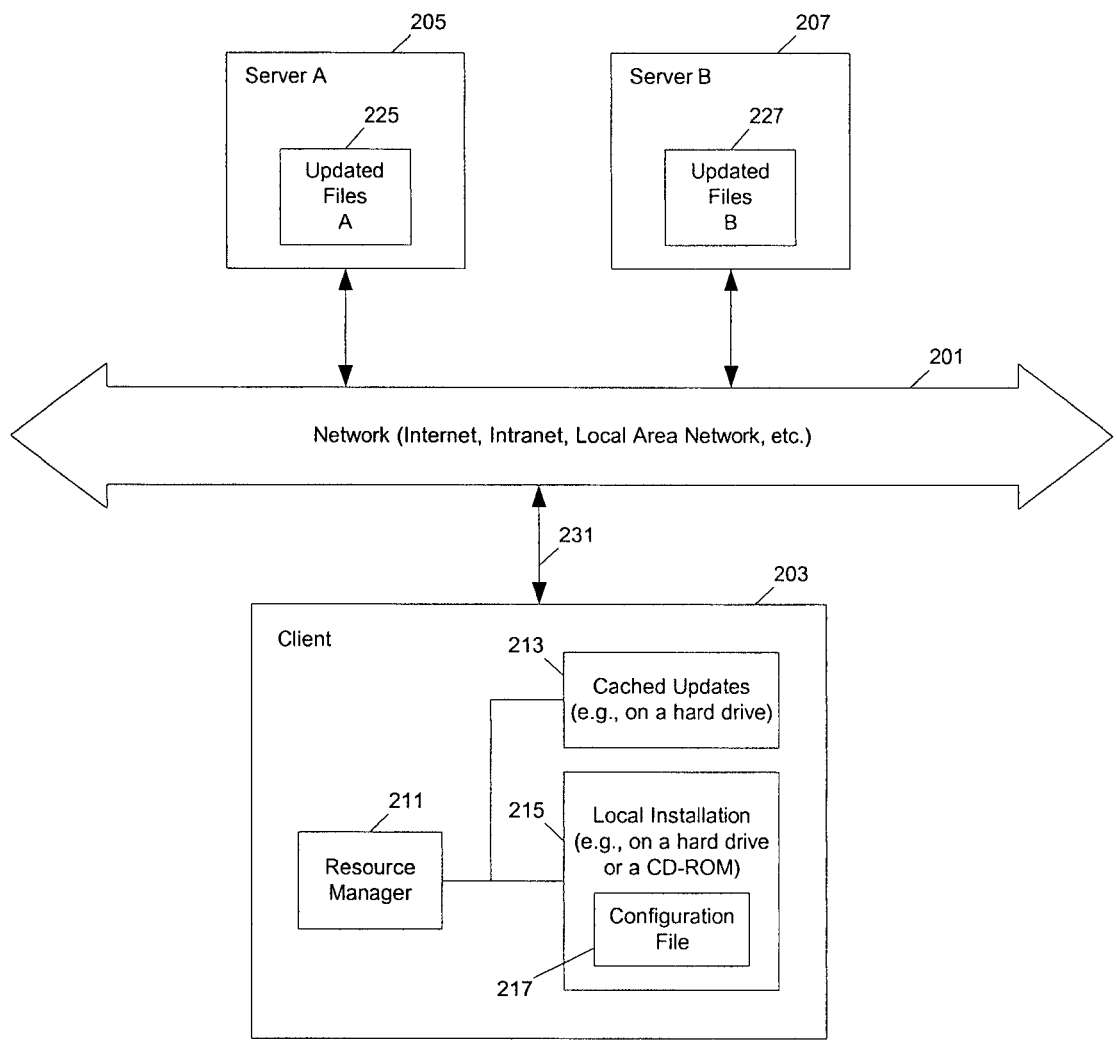
FIG. 2 shows a schematic diagram of a system for updating files through a network according to one embodiment of the present invention.

FIG. 2 shows a schematic diagram of a system for updating files through a network according to one embodiment of the present invention. Client computer 203 contains resource manager 211, which dynamically locates a resource according to configuration file 217. Local installation 215 contains a default version of the resources on a local storage device (e.g., a hard drive, or a CD-ROM), which can always be accessed by client computer 203, regardless of the status of the network connection. When client computer 203 is connected to network 201 (e.g., Internet, intranet, Local Area Network (LAN), etc.) through communication link 231 (e.g., a modem attached to a telephone line, a network interface card attached to a network cable, a cable modem attached to a cable television network, a transceiver for a wireless communication network, etc), an updated version of the resource can be retrieved from servers, such as server 205 or 207. When downloaded, the updated version of the resource is stored as cached updates 213 on client computer 203 so that the updated version of the resource can be used later without resorting to the servers. Configuration file 217 specifies the addresses of the remote servers for updated versions of resources. Configuration file 217 can also store additional information, such as whether or not a version of the resource on the remote server is preferred. When a version of the resource on the remote server is preferred, the remote server is always checked for an updated version when network connection 231 is available; otherwise, either the cached update or the local installation is used. Thus, depending on the configuration parameters in configuration file 217, resource manager 211 either retrieves updated versions of the resources for the local installation from one or more servers or loads cache updates or the local installation from a local storage device. It will be understood that various different types of protocols (e.g., HTTP, FTP (File Transfer Protocol)), servers, and network connection media (e.g., ethernet network interface cards, modems for telephone lines, cable television networks, or Digital Subscriber Lines (DSL), transceivers for wireless networks) can be used with various embodiments of the present invention in retrieving updated versions of resources through network connections. Methods to dynamically locate the resources are described bellow.

Figure 3:
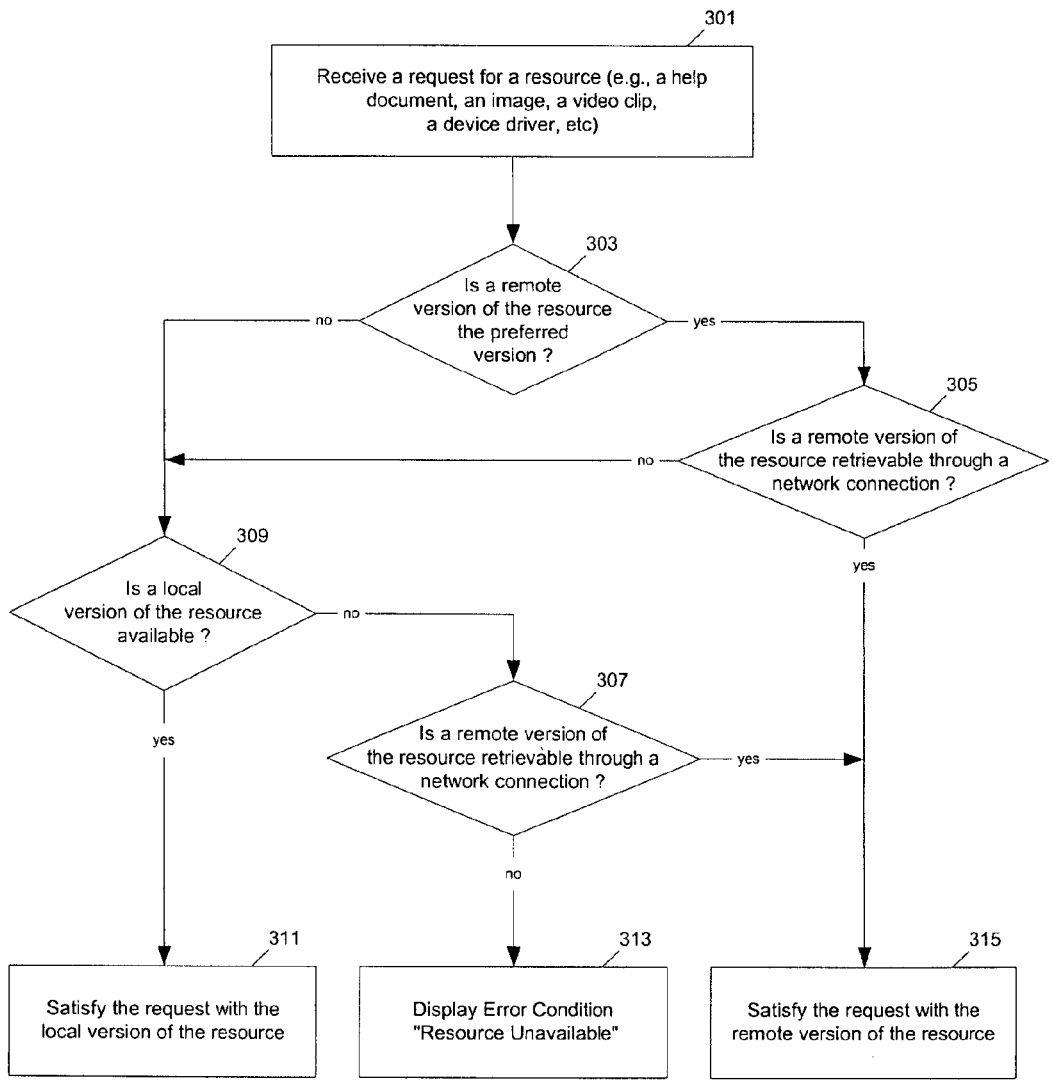
FIG. 3 shows a flow chart of a method to locate a resource according to one embodiment of the present invention.

FIG. 3 shows a flow chart of a method to locate a resource according to one embodiment of the present invention. Operation 301 receives a request for a resource (e.g., a help document, an image, a video clip, a device driver, etc). From a configuration file operation 303 determines whether or not a remote version of the resource is the preferred version. If a remote version of the resource is the preferred version, operation 305 determines whether or not a remote version of the resource is retrievable through a network connection. When a remote version of the resource is retrievable through a network connection, operation 315 satisfies the request with the remote version of the resource. If operation 305 determines that a remote version of the resource is not retrievable through a network connection, or operation 303 determines that a remote version of the resource is not the preferred version, operation 309 is performed to determine whether or not a local version of the resource is available. When a local version of the resource is available, operation 311 satisfies the request with the local version of the resource; otherwise, if operation 307 determines that a remote version of the resource is retrievable through a network connection, operation 315 satisfies the request with the remote version of the resource. If operation 307 determines that a remote version of the resource is not retrievable through a network connection, operation 313 displays a message to indicate that the resource is not available.

Figure 4:
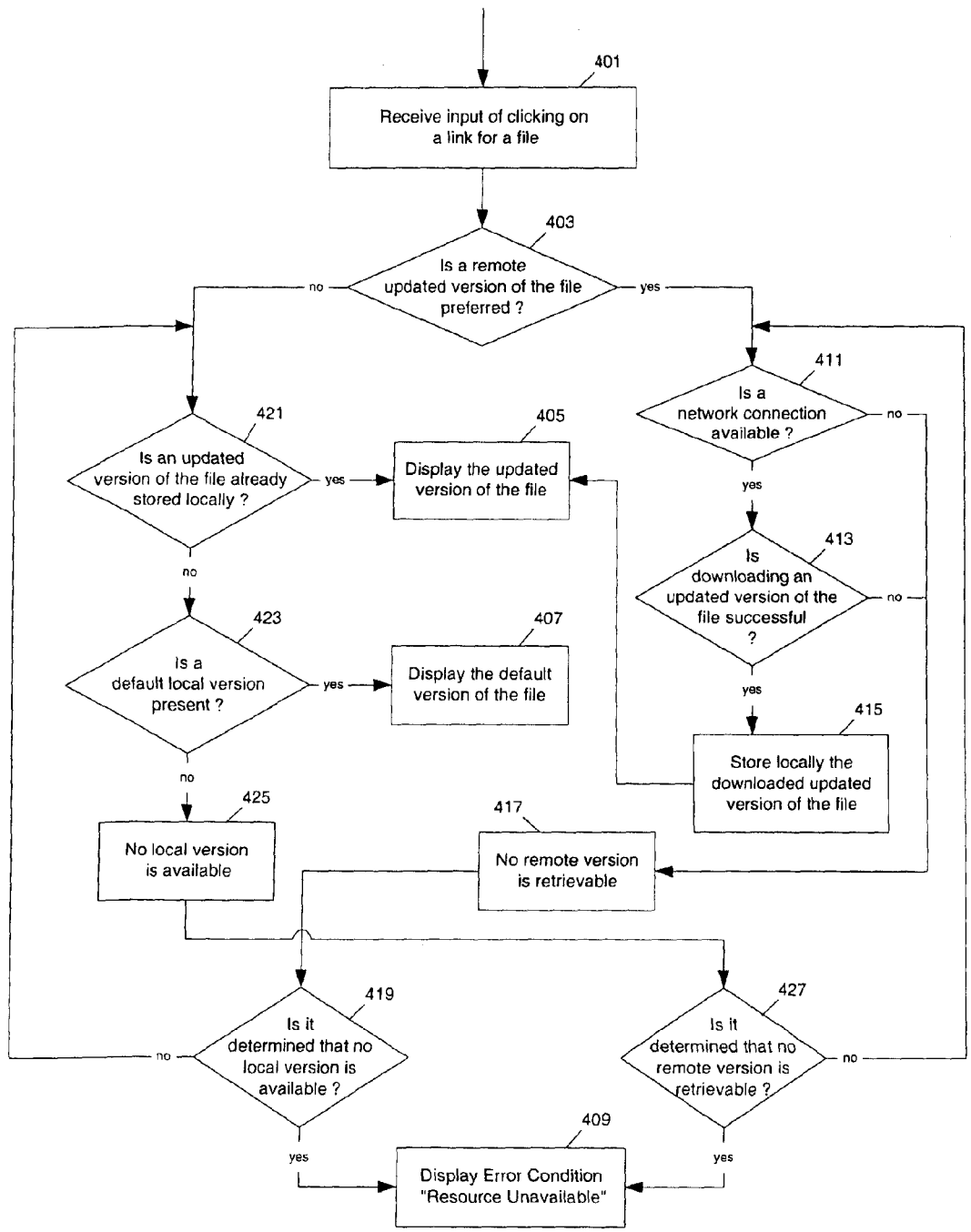
FIG. 4 shows a detailed flow chart of a method to locate a file according to one embodiment of the present invention.

FIG. 4 shows a detailed flow chart of a method to locate a file according to one embodiment of the present invention. After operation 401 receives an input of clicking on a link for a file (e.g., by positioning a mouse controlled cursor on an item, representing a file, displayed on a display screen which is coupled to the mouse and by selecting the item by pressing and releasing a button while the cursor is on the item), operation 403 determines whether or not a remote updated version of the file is preferred. If a remote updated version of the file is preferred, operation 411 is performed to determine whether or not a network connection is available; and operation 413 determines whether or not an updated version of the file is successfully downloaded if a network connection is available. If downloading an updated version of the file is successful, operation 415 stores the downloaded updated version of the file on a local storage device; and operation 405 displays the updated version of the file. When no network connection is available, or downloading an updated version of the file is not successful, it is concluded that no remote version is retrievable in operation 417; and operation 419 is performed to determine whether or not it is already determined that no local version is available. If it is already determined that no local version is available, operation 409 displays an error message to indicate the error condition "resource unavailable"; otherwise, operation 421 is performed. If operation 403 determines that a remote updated version of the file is not preferred, operation 421 is performed to determine whether or not an updated version of the file is already cached in a local storage device; and operation 423 determines whether or not a default local version is present if no updated version of the file is cached. If an updated version of the file is already stored locally, operation 405 displays the updated version of the file. If a default local version is present, operation 407 displays the default version of the file. When no updated version of the file is stored locally and no default local version is present, it is concluded that no local version is available in operation 425; and operation 427 is performed to determine whether or not it is already determined that no remote version is retrievable. If it is already determined that no local version is retrievable, operation 409 displays an error message; otherwise, operation 411 is performed.

Figure 5:
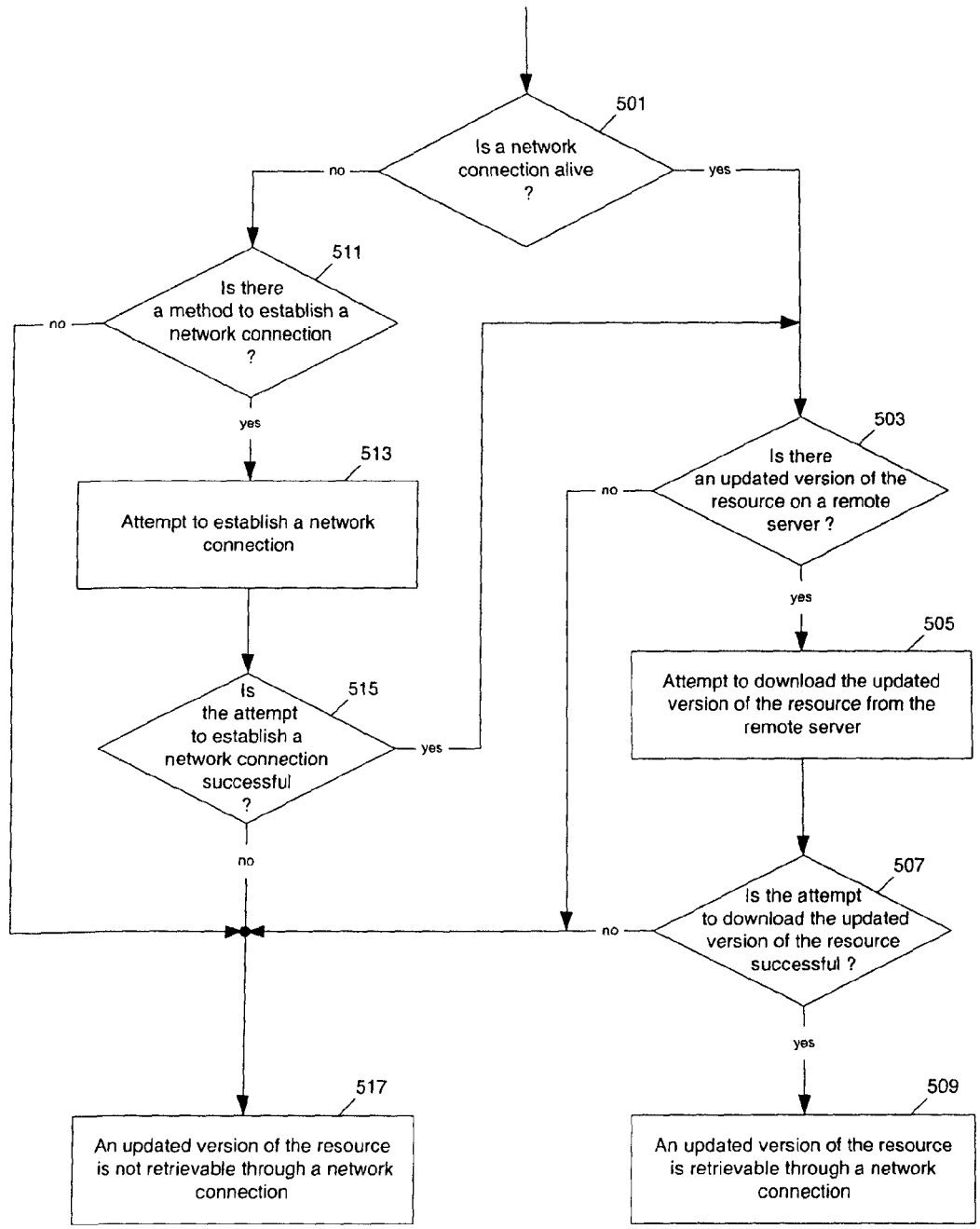
FIG. 5 illustrates an example flow diagram of a method to determine whether or not an updated version of a resource is retrievable through a network connection according to one embodiment of the present invention.

FIG. 5 illustrates an example flow diagram of a method to determine whether or not an updated version of a resource is retrievable through a network connection according to one embodiment of the present invention. Operation 501 determines whether or not a network connection is alive. If no network connection is alive and operation 511 determines that there is a method to establish a network connection, operation 513 attempts to establish a network connection (e.g., instruct a modem to call an Internet service provider, etc.). If operation 515 determines that the attempt to establish a network connection is successful, operation 503 is performed. If there is no method to establish a network connection, or the attempt to establish a network connection failed, it is concluded that an updated version of the resource is not retrievable through a network connection in operation 517. If operation 501 determines that a network connection is alive and operation 503 determines that there is an updated version of the resource on a remote server, operation 505 attempts to download the updated version of the resource from the remote server. If operation 507 determines that downloading the updated version of the resource is successful, it is concluded that an updated version of the resource is retrievable through a network connection in operation 509. If operation 503 determines that there is no updated version of the resource at a remote server, or operation 507 determines that downloading the updated version of the resource is not successful, it is concluded that an updated version of the resource is not retrievable through a network connection in operation 517.

FIGS. 4 and 5 show example sequences of checking for an updated version of resources from a remote server, cached updates, and local installation. From this description, it will be apparent to one skilled in the art that various different sequences can be used or configured using configuration parameters. For example, it may be configured that the cached updates are searched first for an updated version of the resource before attempting to contact the remote server for an updated version. Further, some resources are frequently used. Thus, it is not desirable to check the remote server for an update version every time these resources are used. Thus, control parameters can be used to limit the frequency to check the remote server for the updated version. For example, an HTML document can have a tag to specify when a cached document expires; or the resource manager can maintain a default frequency for checking the remote server; or such a frequency related configuration parameter for checking the remote server can be specified in the configuration file.

Further various methods can be used to determine whether or not the updated version of the resource on the server is different from (or more recent than) a version on the local storage device. For example, "HTTP conditional get" can be used to download a resource that is modified. An HTTP server that meets the HTTP 1.1 specification returns "304 File Not Modified" to indicate that the resource on the server is the same as that in the cached updates. In another embodiment of the invention, a version number is used to determine whether the server contains an update version for the resource.

Figure 6:
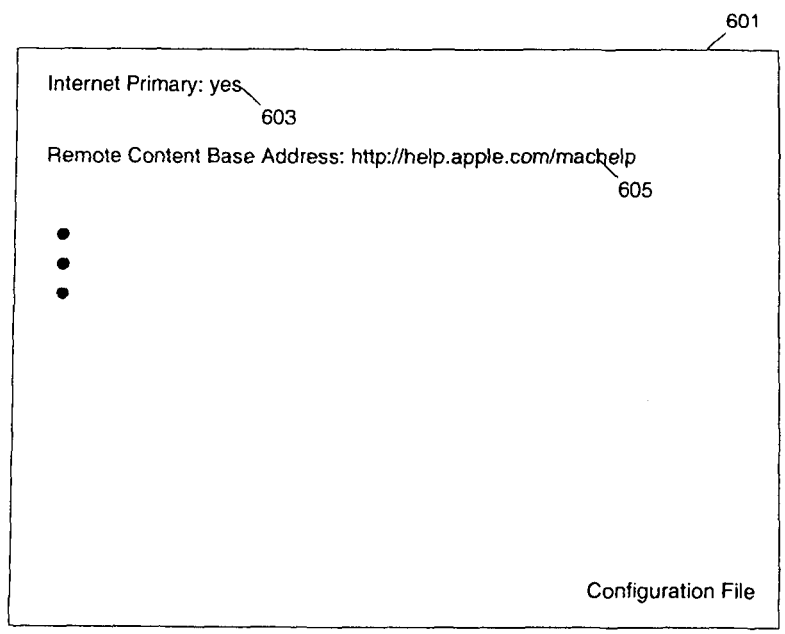
FIG. 6 illustrates a configuration file for specifying parameters for dynamically locating resources according to one embodiment of the present invention.

FIG. 6 illustrates a configuration file for specifying parameters for dynamically locating resources according to one embodiment of the present invention. Configuration file 601 contains entry 603 which specifies whether or not the resource controlled by the configuration file is "internet primary". If it is "internet primary", a remote updated version is preferred; otherwise, a remote updated version is not preferred. Typically, when the resource is newly released, it can be set to "internet primary" so that updates can be delivered to the users as soon as the updates are available on the server; when the final version of the resource is released or the product is no longer supported, the configuration parameter can be updated to turn off "internet primary" (e.g., when an update version of the configuration file is downloaded as a resource used for determining configuration parameters), and thus the local version is the preferred (and current) version.

Configuration file 601 also contains entry 605 which specifies the remote content base address. In one embodiment of the present invention, the remote content base address is in the URL format. Thus, the address of the remote server and the protocol to contact the remote server for retrieval are included in the remote content base address. A resource controlled by the configuration file can be accessed from a location relative to the remote content base address. In one embodiment of the present invention, the updated version of a resource having a URL address relative to the configuration file is located at the same relative address with respect to the remote content base address. For example, if: i) the configuration file is MacHelp/configuration, ii) the resource controlled by the configuration file is MacHelp/Mail/index.htm, and iii) the remote content base address is http://help.apple.com/machelp, then the complete URL for the updated version of the resource is http://help.apple.com/machelp/Mail/index.htm. From this description, it will be apparent to one skilled in the art that various configuration file formats and options can be used to map an address for a local resource to a remote address for retrieving an updated version of the resource. Furthermore, these configurations can be dynamically changed over time, such that at one point in time, the address for the resource is a remote server and another, later point in time, it is a first local file address and at yet another point in time, it is a second local file address. A configuration file can specify a number of alternative remote or local content base addresses so that the updated version of the resource may be obtained from a number of different alternative locations. Different protocols (e.g., HTTP, FTP, etc) and server addresses may be specified. In other embodiments of the present invention, a configuration file can also explicitly specify the remote addresses of the updated version of the resources. The configuration information can be embedded in certain resource files (e.g., index HTML files), or be stored in separate configuration files.

Figure 7:
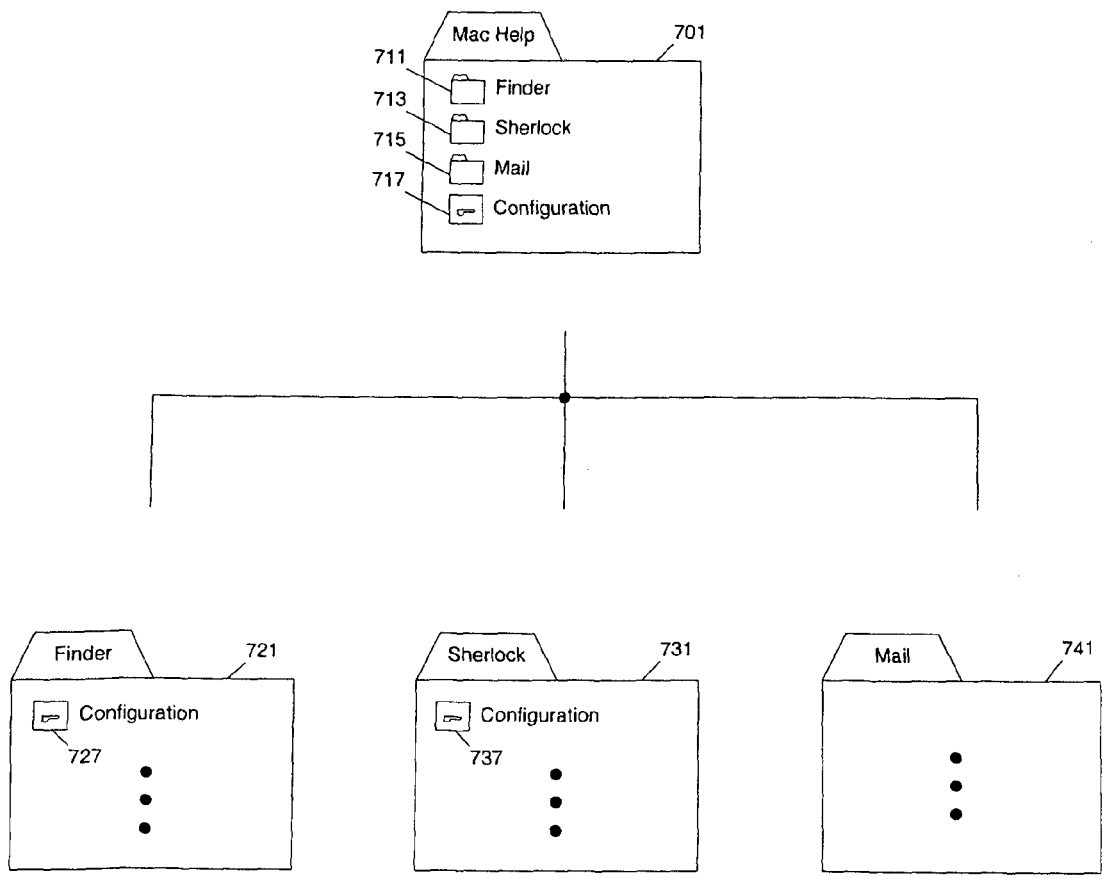
FIG. 7 illustrates a scheme to specify parameters for dynamically locating resources according to one embodiment of the present invention.

FIG. 7 illustrates a scheme to specify parameters for dynamically locating resources according to one embodiment of the present invention. The locally installed resources are organized in a typical file tree in the local file system. For example, folder 701 contains help documents on a system. Folders 711 715 located inside folder 701 contain help documents for programs Finder, Sherlock, and Mail respectively. Folders 711, 713 and 715 correspond to folders 721, 731 and 741 respectively. Configuration file 717 controls (specifies the configuration parameters for) the resource files in folder 701. A configuration file in a folder also recursively controls the resource files in its child folders of various levels that do not have configuration files in the their own folders and that do not have configuration files in the corresponding parent folders except the folder itself. For example, folder 741 contains no configuration file. Its closest parent folder that has a configuration file contains the configuration file that controls the resources in it. Thus, configuration file 717 controls the resources in folder 741. Since folders 721 and 731 contain configuration files 727 and 737 respectively, configuration file 717 will not control any of the files in folders 721 and 731 and their child folders. When such a scheme is used, existing help systems can be used without modification; and new configurations can be easily added to dynamically locate the resources according to the configuration files. The configuration files can also have corresponding remote updated versions. Thus, updated configuration files can be accessed from a server to control whether or not the remote version is preferred and to specify new locations for updated resources.

A configuration file is illustrated in the above examples to store the indicator of whether or not a version of the resource on a server is preferred. Whether or not a version of the resource on a server is preferred can also be determined according to system conditions, and/or a file on a remote server. For example, it may be determined that within a time period (e.g., one year) from a release date of the resource, the version of the resource on the server is preferred; after a time period (e.g., two years) from the release date, the version of the resource on the server is not preferred. Alternatively, a determination of whether or not a remote version of the resource is preferred can be made from other indicators, such as the release date and the version number of the operating system, the current date, options previously selected by a user, and others. Further, the address of the server may be hardwired, or determined from a search at a remote server, or determined from a file at a remote server or other locations.

When methods to dynamically locate resources according to various embodiments of the present invention are used in a Help system, such as a Help system which displays user help information for operating a computer through a web browser such as Internet Explorer, the latest version is always used when the client computer is connected to the server through a network connection (e.g., Internet). When a Help page is requested, references to the HTML resources are examined to determine if they can be substituted with newer versions on the server. However, if the client computer is not connected to the network, either copies of recently retrieved pages are used, or as a last resort, the locally installed files are displayed.

Thus, authors of the Help system don't need to know, or define, which part of the Help system will be remotely retrieved. They are free to concentrate on creating the information without the overhead of deciding which topics will be remotely or locally stored. With certain embodiments of the invention, different sections of the Help system can be designated as being local-only or remote-version-preferred. These designations can be changed at any time in the life cycle of the help documents, even after the system is installed on the client computer and even after the user has used the computer for some time. The various embodiments discussed herein typically use a help viewer program which may be a web browser, such as Internet Explorer or Netscape's Internet Navigator. These help viewer programs will typically read the help information files which include addresses which may be modified by the configuration files in the manner described herein.

The client computer transparently gets the latest "help" information, when connected to the network; yet the client computer still has full help information available, from the local file system when off the network. When new features are added, or new information about a product is available, the Help system can be silently updated (by, e.g., updating later versions from a server) and made available to the users without the necessity of publicizing and installing updated files and without requiring a software or operating system update or upgrade.

Although methods of various embodiments of the present invention are illustrated with URL addresses and HTTP protocol, it will apparent to one skilled in the art from this description that the present invention can be used with various different types of schemes for addressing and various different types protocols for retrieving resources. Further, the resources that can be dynamically located are not limited to those for displaying a document. It will be understood that various types of resources (e.g., device drivers, program components, packages for localization and translation, etc) can be dynamically located (or updated) using methods of various embodiments of the present invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   identifying, by a processor of a client device, a remote location from a plurality of locations from which to obtain a resource, the identifying based on preference criteria, and dynamically changing conditions, and wherein the preference criteria include configuration information including an address of the remote location for the resource stored on a client device; and
   transparently obtaining a later version of the resource from the identified location, wherein while an earlier version of the resource is available for use at the client device even when the client device is disconnected from a network;
   updating the configuration information based upon the obtained later version; and
   updating the earlier version of the resource with the later version of the resource without publicizing to a user of the client device.

2. The method of claim 1, further comprising:
   responsive to an unsuccessful obtaining of the resource, identifying an alternate location from which to obtain the resource.

3. The method of claim 1, wherein the plurality of repositories comprises at least one of a local disk, an optical drive, a disk or drive available through a local area network (LAN), and a remote server.

4. The method of claim 1, wherein the dynamically changing conditions include system conditions.

5. The method of claim 4, wherein the dynamically changing conditions further include a period since a release date of the resource, and wherein system conditions include a version number and a release date of an operating system of the client device.

6. The method of claim 1, wherein the preference criteria indicates whether a first version of the resource on a remote server is preferred over any version of the resource stored locally.

7. A non-transitory computer-readable storage medium comprising executable instructions to cause a processor to perform operations comprising:
   identifying a remote location from a plurality of locations from which to obtain a resource, the identifying based on preference criteria, and dynamically changing conditions, and wherein the preference criteria include configuration information including an address of the remote location for the resource stored on a client device; and
   transparently obtaining a later version of the resource from the identified remote location, wherein an earlier version of the resource is available for use at the client device even when the client device is disconnected from a network;

updating the configuration information based upon the obtained later version; and updating the earlier version of the resource with the later version of the resource without publicizing to a user of the client device.

8. The non-transitory computer-readable storage medium of claim 7 further comprising executable instructions to cause a processor to perform operations comprising:

responsive to an unsuccessful obtaining of the resource, identifying an alternate location from which to obtain the resource.

9. The non-transitory computer-readable storage medium of claim 7, wherein the plurality of repositories comprises at least one of a local disk, an optical drive, a disk or drive available through a local area network (LAN), and a remote server.

10. The non-transitory computer-readable storage medium of claim 7, wherein the dynamically changing conditions include system conditions.

11. The non-transitory computer-readable storage medium of claim 10, wherein the dynamically changing conditions further include a period since a release date of the resource, and wherein system conditions include a version number and a release date of an operating system of the client device.

12. The non-transitory computer-readable storage medium of claim 7, wherein the preference criteria indicates whether a first version of the resource on a remote server is preferred over any version of the resource stored locally.

13. The non-transitory computer-readable storage medium of claim 7, wherein the resource includes a software which includes at least one help file.

14. A data processing system comprising:

a memory; and a processor configurable by instructions stored in the memory to:

identify a remote location from a plurality of locations from which to obtain a resource, wherein the identification is based on preference criteria, and dynamically changing conditions, wherein the preference criteria include configuration information including an address of the remote location for the resource stored on a client device;

transparently obtaining a later version of the resource from the identified remote location, wherein an earlier version of the resource is available for use at the client device even when the client device is disconnected from a network;

updating the configuration information based upon the obtained later version; and updating the earlier version of the resource with the later version of the resource without publicizing to a user of the client device.

15. The method of claim 1, wherein the resource includes a software which includes at least one help file.

16. The data processing system of claim 14 wherein the processor is further configured to responsive to an unsuccessful obtaining of the resource, identify an alternate location from which to obtain the resource.

17. The data processing system of claim 14, wherein the plurality of repositories comprises at least one of a local disk, an optical drive, a disk or drive available through a local area network (LAN), and a remote server.

18. The data processing system of claim 14, wherein the dynamically changing conditions include system conditions.

19. The data processing system of claim 18, wherein the dynamically changing conditions further include a period since a release date of the resource, and wherein system conditions include a version number and a release date of an operating system of the client device.

20. The data processing system of claim 14, wherein the preference criteria indicates whether a first version of the resource on a remote server is preferred over any version of the resource stored locally.

21. The data processing system of claim 14, wherein the resource includes a software which includes at least one help file.

22. The data processing system of claim 14, wherein the client device transparently obtains a later version of the resource while an earlier version of the resource is available for use at the client device even when the client device is disconnected from a network.

* * * * *